United States Patent [19]

Libbey

[11] 3,927,058

[45] Dec. 16, 1975

[54] METHOD OF PRODUCING ALKYLTRIFLUOROSILANE COMPOUNDS

[75] Inventor: William J. Libbey, Ponca City, Okla.

[73] Assignee: Continental Oil Company, Ponca City, Okla.

[22] Filed: Feb. 10, 1975

[21] Appl. No.: 548,857

Related U.S. Application Data

[63] Continuation-in-part of Ser. No. 431,516, Jan. 7, 1974, abandoned, Continuation of Ser. No. 224,961, Feb. 9, 1972, abandoned.

[52] U.S. Cl. .................. 260/448.2 E; 260/448.8 R
[51] Int. Cl.² ........................ C07F 7/08; C07F 7/12
[58] Field of Search ............................. 260/448.2 E

[56] References Cited
UNITED STATES PATENTS

| | | | |
|---|---|---|---|
| 2,895,977 | 7/1959 | Fitch | 260/448.2 E |
| 2,921,951 | 1/1960 | Jenkner | 260/448.2 E |
| 3,621,045 | 11/1971 | Muller et al. | 260/448.2 E |

FOREIGN PATENTS OR APPLICATIONS

| | | | |
|---|---|---|---|
| 972,855 | 10/1959 | Germany | 260/448.2 E |
| 948,975 | 9/1956 | Germany | 260/448.2 E |
| 756,612 | 9/1956 | United Kingdom | 260/448.2 E |

*Primary Examiner*—Paul F. Shaver

[57] ABSTRACT

Alkyltrifluorosilane compounds are produced by reacting an organo-aluminum compound having the general formula $AlR_3$ wherein R is an alkyl group containing at least three carbon atoms with silicon tetrafluoride. The incorporation of complexing agents into the reaction mixture increases the yield of said alkyltrifluorosilane compounds.

8 Claims, No Drawings

METHOD OF PRODUCING ALKYLTRIFLUOROSILANE COMPOUNDS

This is a continuation-in-part of Ser. No. 431,516, filed Jan. 7, 1974, now abandoned, which in turn was a continuation of Ser. No. 224,961, filed Feb. 9, 1972, now abandoned.

This invention relates to a method for producing alkyltrifluorosilane compounds having the general formula $SiF_3R$ wherein R is an alkyl group containing at least three carbon atoms.

Organo-silicon halides, for example methyl silicon chlorides, have been manufactured commercially by the use of Grignard reagents, or elemental silicon plus alkyl chloride in the presence of a copper catalyst. These processes have several disadvantages particularly with regard to the economics of the use of catalyst and reagents. Other methods have been proposed for the production of organic silicon compounds such as disclosed in British Pat. No. 756,612 wherein $Al(C_2H_5)_3$ is reacted with a compound containing silicon and fluorine wherein the fluorine atom is directly bonded to the silicon atom. In such a process the product formed has been reported to contain a mixture of the alkyltrifluorosilane compound, the dialkyldifluorosilane compound, the trialkylfluorosilane compound, and the tetraalkylsilane compound. In such a process the combined dialkyldifluorosilane, trialkylmonofluorosilane, and tetraalkylsilane products always constitute a major portion of the total product.

According to the present invention it has been found that alkyltrifluorosilane compounds can be produced in high yield, and usually with improved selectivity, by the reaction of a complex of an aluminum alkyl having the general formula $Al(R)_3$ wherein R is an alkyl group containing at least three carbon atoms with silicon tetrafluoride. Alkyltrifluorosilane compounds, upon hydrolysis and condensation yield silicon products which are useful as lubricants and water repellents and other well-known utilities.

The reaction can be carried out over a broad range of temperatures and pressures. Desirable results have been obtained using temperatures in the range of from about 25°C to 300°C, preferably from about 100°C to 225°C. Employing temperatures much below about 25°C results in impractically slow reaction rates. Temperatures above about 300°C may be used provided that degradation is avoided. Pressures are not critical in the process, practicality being the primary consideration. In general, pressures in the range of about atmospheric to about 3000 psi may be used, preferably 100 to about 1,000 psi.

The process may be carried out in either a batch-wise or continuous manner as will be recognized by those skilled in the art.

Because of the reactants involved in the abovedescribed reaction, as well as the product desired, the reaction must be carried out in the absence of moisture and oxygen or the yield of the desired product, as well as the selectivity for the product by the reaction, will be seriously affected. Thus, it has been found advantageous to carry out the reaction in an anhydrous inert atmosphere, employing inert gases such as argon, nitrogen and the like.

In carrying out the process, the amount of silicon tetrafluoride to the aluminum alkyl component of the complex should be at least 3. Desirable results have been obtained wherein the molar ratio of the silicon tetrafluoride to the aluminum trialkyl component is in the range of from about 3:1 to 6:1.

The aluminum trialkyl complex used in the process is forming by the addition of a complexing agent to the aluminum trialkyl. The aluminum trialkyl may be represented by the general formula $Al(R)_3$ wherein R is an alkyl group containing at least three carbon atoms. The lower limits of the chain length of the alkyl radical is important if one is to obtain a high selectivity to the formation of the desired alkyltrifluorosilane compounds. Evidence of the importance of the lower limit of the chain length of the alkyl radical can be seen by reviewing British Pat. No. 756,612 which teaches that when aluminum triethyl, $Al(C_2H_5)_3$, is reacted with compounds containing silicon and fluorine, such as $SiF_4$, a product is formed which contains a major portion of tetraethylsilane and diethyldifluorosilane. However, when using the aluminum alkyl wherein the alkyl groups contained at least three carbon atoms the major product formed is alkyltrifluorosilane. The upper limit of the chain length of the alkyl radical is limited only by practicality. Thus, under normal conditions the chain length of the alkyl radical of the aluminum alkyl compound would range from three to about 20 carbon atoms. However, especially desirable results have been obtained wherein R contains from 4 to about 12 carbon atoms. The alkyl groups may be straight chain or may be branched at any position other than the alpha position. Examples of suitable aluminum alkyls are aluminum tripropyl, aluminum tributyl, aluminum trihexyl, aluminum trioctyl, aluminum tridecyl, aluminum tridodecyl, aluminum tritetradecyl, aluminum trihexadecyl, aluminum trioctadecyl, aluminum trieicosyl, aluminum triisobutyl, aluminum tri-2-ethylhexyl and the like.

Any suitable complexing agent which does not interfere in the production of alkyltrifluorosilane can be employed. In general, the suitable complexing agents include tetrahydrofuran; m-dioxane; P-dioxane; triethylenediamine; quinoline; isoquinoline; aliphatic amines of the formula

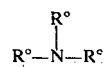

wherein each R° is a straight chain alkyl group having 1 to 6 carbon atoms; and cyclic amines of the formula

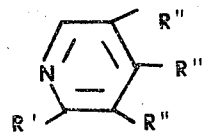

wherein R' is hydrogen or methyl, and each R'' is hydrogen or an alkyl group having 1 to 10 carbon atoms provided that any two adjacent R'' groups together with the nuclear carbon atoms to which they are attached may represent a single ring having 5 to 7 carbon atoms.

While the amount of complexing agent can vary widely, desirable results have been obtained where the amount of complexing agent employed varies in a molar ratio with the aluminum trialkyl from about 0.4:1 to 3:1. Especially desirable results have been obtained wherein the molar ratio of the complexing agent to the aluminum trialkyl is about 1:1.

In order to more fully describe the present invention the following examples are given. However, it is to be understood that these examples are for illustrious purposes only and are not intended to unduly limit the scope of the present invention. In each example the percentages are weight percentages unless otherwise specified.

EXAMPLE 1

A 100 ml stainless steel autoclave was charged with 10.75 g (0.039 moles) of a 1:1 molar complex of aluminum tributyl and pyridine and 18.5 g (0.178 moles) of $SiF_4$. The reaction was run under an argon atmosphere with stirring. The autoclave was heated for 1 hour at 125°C and an additional 1.25 hours at 145°C. The light yellow liquid product weighed 15.0 g and had the following composition by GC analysis (peak areas):

| | |
|---|---|
| n-butane + butenes | 1.2% |
| $C_4H_9SiF_3$ | 98.6% |
| $(C_4H_9)_2SiF_2$ | 0.1% |
| $(C_4H_9)_3SiF$ | 0 |
| Others | 0.1% |

The percent conversion of the aluminum tributyl complex to $C_4H_9SiF_3$ was 96%.

EXAMPLE 2

The experimental procedure for this reaction and subsequent examples are the same as detailed in Example 1; thus, only quantities used and results are noted.

The reaction of 9.2 g (0.0207 moles) of a 1:1 molar complex of aluminum trioctyl and pyridine and 7.7 g (0.074 moles) of $SiF_4$ was carried out at 125°C for 1.0 hours and at 145°C for an additional 1.25 hours. The liquid product weighed 8.6 g and had the following composition (peak areas on glpc):

| | |
|---|---|
| n-octane + octenes | 12.5% |
| $C_8H_{17}SiF_3$ | 85.1% |
| $(C_8H_{17})_2SiF_2$ | 0 |
| $(C_8H_{17})_3SiF$ | 0 |
| Others | 2.5% |

The percent conversion of the aluminum trioctyl complex to $C_8H_{17}SiF_3$ was 74%.

EXAMPLE 3

The reaction of 13.85 g (0.0262 moles) of a 1:1 molar complex of aluminum tridecyl and pyridine and 10.3 g (0.099 moles) of $SiF_4$ was carried out for 1 hour at 125°C and an additional 1.25 hours at 145°C. The liquid product weighed 10 g and had the following composition (peak areas from glpc):

| | |
|---|---|
| n-decane + decenes | 11.2% |
| $C_{10}H_{21}SiF_3$ | 83.9% |
| $(C_{10}H_{21})_2SiF_2$ | 0 |
| $(C_{10}H_{21})_3SiF$ | 0 |
| Others | 4.9% |

The percent conversion of the aluminum tridecyl complex to $C_{10}H_{21}SiF_3$ was 53%.

EXAMPLE 4

The reaction of 10.6 g (0.0383 moles) of a 1:1 molar complex of aluminum tributyl and pyridine and 14.9 g (0.143 moles) of $SiF_4$ was carried out at 125°C for 0.5 hours, an additional one hour at 145°C, and another 1 hour at 255°C. The liquid product weighed 15.5 g and had the following composition (peak areas on glpc):

| | |
|---|---|
| n-butane + butenes | 1.33% |
| $C_4H_9SiF_3$ | 98.5% |
| $(C_4H_9)_2SiF_2$ | 0.06% |
| $(C_4H_9)_3SiF$ | 0 |
| Others | 0.1% |

The percent conversion of aluminum tributyl complex to $C_4H_9SiF_3$ was 97%.

EXAMPLE 5

The reaction of 7.11 g (0.026 moles) of a 1:1 molar complex of aluminum tributyl and tetrahydrofuran and 8.9 g (0.086 moles) of $SiF_4$ was carried out for 35 minutes at 125°C, another 65 minutes at 145°C, and another 60 minutes at 225°C. The liquid portion of the product weighed 10.2 g and had the following composition (peak areas on glpc):

| | |
|---|---|
| n-butane + butenes | 6.1% |
| $C_4H_9SiF_3$ | 85.1% |
| tetrahydrofuran | 4.7% |
| $(C_4H_9)_2SiF_2$ | 0.5% |
| $(C_4H_9)_3SiF$ | 0.1% |
| Others | 3.6% |

The conversion of tributyl aluminum complex to alkylfluorosilanes was 82%.

EXAMPLE 6

The reaction of 14.9 g (0.051 moles) of the 1:1 molar complex of aluminum triisobutyl and pyridine and 17.3 g (0.166 moles) of $SiF_4$ was carried out for 1.0 hour at 130°C and 1.25 hours at 150°C. The distilled liquid product weighed 17.2 g and had the following composition (peak areas on glpc):

| | |
|---|---|
| hydrocarbons | 1.7% |
| $i$-$C_4H_9SiF_3$ | 96.4% |
| $(i$-$C_4H_9)_2SiF_2$ | 0 |
| Others | 1.9% |

The percent conversion of the aluminum triisobutyl complex to isobutyltrifluorosilane was 76%.

EXAMPLE 7

The invention is further demonstrated by employing the procedure of Example 6 modified to use a 2:1 molar complex of tetrahydrofuran and aluminum tridecyl.

EXAMPLE 8

The invention is further demonstrated by employing the procedure of Example 6 modified to use a 3:1 molar complex of isoquinoline and aluminum tripentadecyl, aluminum tritetradodecyl or aluminum trihexadecyl.

EXAMPLE 9

The invention is further demonstrated by employing the procedure of Example 6 modified to use a 1:1 molar complex of a complexing agent and aluminum tridodecyl wherein the complexing agent is triethylamine, tributylamine, trihexylamine, diethylbutylamine, m-dioxane, p-dioxane, 2-methyl-4-butylpyridine, 3,5-dioctylpyridine, 2-methyl-5-butyl-pyridine, or triethylenediamine.

EXAMPLE 10

The reaction of 11.44 g (0.039 moles) of the 1:1 molar complex of aluminum tributyl and 4-methylpyridine and 18.5 g (0.176 mole) of $SiF_4$ was carried out for 1 hour at 125°C and for 1.25 hours at 145°C. The liquid product weighed 15.06 g and had the following composition (peak areas on glpc):

| | |
|---|---|
| $C_4H_9SiF_3$ | 94.0% |
| $(C_4H_9)_2SiF_2$ | 2.4% |
| $(C_4H_9)_3SiF$ | 0.2% |
| Other | 3.4% |

The percent conversion of aluminum tributyl complex to $C_4H_9SiF_3$ was 82%.

EXAMPLE 11

The reaction of 12.79 g (0.044 mole) of the 1:1 molar complex of aluminum tributyl and 4-methylpyridine and 21.8 g (0.21 mole) of $SiF_4$ was carried out for 1 hour at 100°C and for 1.25 hours at 120°C. The liquid product weighed 16.05 g and had the following composition (peak areas on glpc):

| | |
|---|---|
| $C_4H_9SiF_3$ | 93.4% |
| $(C_4H_9)_2SiF_2$ | 2.4% |
| $(C_4H_9)_3SiF$ | 0.5% |
| Other | 3.7% |

The percent conversion of aluminum tributyl complex to $C_4H_9SiF_3$ was 79%.

EXAMPLE 12

The reaction of 13.31 g (0.046 mole) of the 1:1 molar complex of aluminum tributyl and 2-methylpyridine and 19.7 g (0.189 mole) of $SiF_4$ was carried out for 1 hour at 125°C and 1.25 hours at 145°C. The liquid product weighed 18.58 g and had the following composition (peak areas on glpc):

| | |
|---|---|
| $C_4H_9SiF_3$ | 89.9% |
| $(C_4H_9)_2SiF_2$ | 4.6% |
| $(C_4H_9)_3SiF$ | 0.2% |
| Other | 5.3% |

The percent conversion of aluminum tributyl complex to $C_4H_9SiF_3$ was 83%.

EXAMPLE 13

A series of experiments was conducted using several complexing agents useful in the selective formation of butyltrifluorosilane from the reaction of aluminum tributyl and $SiF_4$. In these experiments equimolar amounts of complexing agent and aluminum tributyl were employed except the experiment using triethylene diamine as the complexing agent where the molar ratio of the complexing agent to aluminum tributyl was 0.5:1. The same experimental procedure as set forth hereinbefore in Examples 1 through 5, were employed. The results of these experiments are tabulated below:

| °C Temperature | Complexing Agent | Alkylfluorosilane Yield Based On Aluminum Tributyl | % Alkyltrifluorosilane of total Alkylfluorosilane Plus Alkylsilicon Hydride Products |
|---|---|---|---|
| 145 | None | 45% | 90.4 |
| 255 | None | 74 | 88.3 |
| 145 | Pyridine | 96 | 99.9 |
| 145 | Isoquinoline | 62 | 99.5 |
| 145 | Trimethyl amine | 43 | 99.5 |
| 145 | Triethyl amine | 48 | 99.4 |
| 255 | Tetrahydrofuran | 82 | 99.4 |
| 255 | Triethylene diamine(a) | 84 | 97.1 |

(a)Mole ratio of triethylene diamine to aluminum tributyl is 0.5:1.

Thus having described the invention in detail it will be understood by those skilled in the art that certain variations and modifications may be made without departing from the spirit and scope of the invention as described herein and defined in the appended claims.

I claim:

1. A method for producing alkyltrifluorosilanes comprising
   a. forming a reaction mixture of $SiF_4$ and an aluminum trialkyl complex; said aluminum trialkyl complex being derived from the addition of a complexing agent to aluminum trialkyl in a molar ratio of 0.4:3/1, respectively; said aluminum trialkyl being defined by $AlR_3$ wherein each R is an alkyl group containing at least 3 carbon atoms; said complexing agent being tetrahydrofuran; m-dioxane; p-dioxane; triethylenediamine; quinoline; isoquinoline; aliphatic amines of the formula

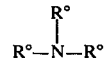

wherein each R° is a straight chain alkyl group having 1 to 6 carbon atoms; and cyclic amines of the formula

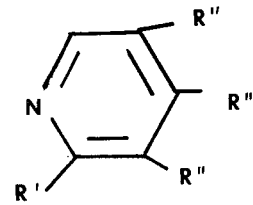

wherein R' is hydrogen or methyl, and each R" is hydrogen or an alkyl group having 1 to 10 carbon atoms provided that any two adjacent R" groups together with the nuclear carbon atoms to which they are attached may represent a single ring having 5 to 7 carbon atoms; the mole ratio of $SiF_4$ to aluminum trialkyl content in the complex being at least 3; and b. subjecting said reaction mixture to reaction at elevated temperatures under a substantially anhydrous and oxygen-free atmosphere.

2. The method of claim 1 wherein said reaction is carried out at a temperature within the range of from about 25° to 300°C and a pressure in the range of from atmospheric to about 3000 psi.

3. The method of claim 1 wherein said molar ratio of SiF$_4$ and aluminum alkyl content in the complex is in the range of about 3:1 to 6:1.

4. The method of claim 2 wherein said reaction is carried out at a temperature in the range of from about 100° to 225°C and at a pressure of about 100-1000 psi in the presence of an inert atmosphere selected from the group consisting of argon, nitrogen, and mixtures thereof.

5. The method of claim 1 wherein said R constituent of said Al(R)$_3$ is an alkyl group containing from about 3 to 20 carbon atoms.

6. The method of claim 5 wherein R contains from about 4 to 12 carbon atoms.

7. The method of claim 1 wherein said complexing agent is present in about 1:1 molar ratio with said aluminum alkyl.

8. The method of claim 1 wherein said complexing agent is selected from the group consisting of pyridine, isoquinoline, 2-methylpyridine, 4-methylpyridine, triethylamine, tetrahydrofuran, trimethyl amine and triethylenediamine.

* * * * *